United States Patent
Aoki et al.

[11] Patent Number: 5,503,205
[45] Date of Patent: Apr. 2, 1996

[54] RADIAL TIRE WITH REDUCTION OF UNEVEN WEAR OF SHOULDER PORTIONS

[75] Inventors: Chieko Aoki; Kazuo Asano, both of Kobe, Japan

[73] Assignee: Sumitomo Rubber Industries, Ltd., Hyogo, Japan

[21] Appl. No.: 145,594

[22] Filed: Nov. 4, 1993

[30] Foreign Application Priority Data

Nov. 5, 1992 [JP] Japan .................................. 4-322638

[51] Int. Cl.$^6$ .............................. B60C 3/00; B60C 9/02; B60C 9/28; B60C 11/00
[52] U.S. Cl. .................... 152/209 R; 152/454; 152/526; 152/528; 152/531; 152/532; 152/538; 152/548
[58] Field of Search ................................. 152/526, 538, 152/531, 532, 454, 209 R, 548, 528

[56] References Cited

U.S. PATENT DOCUMENTS

| | | | |
|---|---|---|---|
| 4,258,776 | 3/1981 | Walters et al. | 152/538 |
| 4,733,706 | 3/1988 | Schmit | 152/538 X |
| 5,299,612 | 4/1994 | Saito et al. | 152/538 X |

FOREIGN PATENT DOCUMENTS

| | | |
|---|---|---|
| 314445 | 5/1989 | European Pat. Off. . |
| 413574 | 2/1991 | European Pat. Off. . |
| 557101 | 8/1993 | European Pat. Off. . |
| 2503053 | 10/1982 | France . |
| 2566334 | 12/1985 | France . |
| 2575423 | 7/1986 | France . |

*Primary Examiner*—Adrienne C. Johnstone
*Attorney, Agent, or Firm*—Birch, Stewart Kolasch & Birch

[57] ABSTRACT

A radial tire improved in the ground pressure distribution, in which the thickness (A) of the tread rubber at the tire equator is larger than the thickness (B) at an effective belt edge point (P), a belt edge camber height (CH) is in the range of from 0.5 to 0.75 times a shoulder camber height (SH), and the belt edge camber height (CH) is in the range of from 0.5 to 0.75 times a carcass camber height (KH), wherein the belt edge camber height (CH) is the radial distance between the effective belt edge point (P) and an axially inner point (Q) located axially inward of the point P by an axial distance of 0.2 times the effective belt width (BE); the tread shoulder camber height (SH) is the radial distance between an axially outer point (R) located at the same axial position as the point (P) and an axially inner point (S) located at the same axial position as the point (Q), both on the tread face; and the carcass camber height (KH) is the radial distance between an axially outer point (T) located at the same axial position as the point (P), and an axially inner point (U) located at the same axial position as the point (Q), both on the carcass thickness center line.

1 Claim, 4 Drawing Sheets

RADIAL TIRE WITH REDUCTION OF UNEVEN WEAR OF SHOULDER PORTIONS

The present invention relates to a radial tire, in which uneven wear such as shoulder wear and heel-and-toe wear is effectively reduced.

BACKGROUND OF THE INVENTION

In the belted radial ply tires, especially which is provided with a stiff steel belt, the ground pressure distribution is liable to become uneven. As a result, uneven wear is liable to occur between the tread crown and tread shoulders. In general, the amount of wear in the tread shoulder is larger than that of the tread crown. Such uneven wear is called shoulder wear.

The shoulder wear is caused by a difference in the tire diameter between the tread crown and tread shoulders due to a curved tread profile. This causes a slip against the ground and the tread shoulders are worn earlier than the tread crown.

Further, a so called heel and toe wear is liable to occur in the tread shoulder, which wear is an uneven wear in the front and rear edges of tread elements such as blocks.

Such uneven wears can be reduced by making the ground pressure distribution even across the whole of the ground contacting width and thereby making the slip amount distribution even.

It has been therefore, considered that the uneven wear can be reduced by increasing the radius of curvature of the tread profile.

However, it was found that when the radius of curvature is excessively increased, the ground pressure is increased in the tread shoulder. As a result, the shoulder wear increases during cornering, and the heel and toe wear increases in the tread crown portion during straight running.

On the other hand, as a counter measure to such uneven ground pressure distribution, many propositions to provide a specific radius of curvature for the belt have been made, for example, in U.S. Pat. No. 4442879, U.S. Pat. No. 4702293, U.S. Pat. No. 4842682, U.S. Pat No. 5061667, CA-A 2018217, EP-A 323519, EP-A 490596, and Japanese Patent Application No. 58-170602.

It was, however, found that even when the belt radius is specifically defined as proposed, the ground pressure distribution is not necessarily even. For example, it was often observed that even when the belt edge portion is decreased in the radius of curvature in comparison with the center portion, the ground pressure is rather increased in the shoulder portion, and uneven wear is not improved.

The present inventors discovered that the ground pressure distribution varies depending on not only the radius of curvature of the belt but also the tread rubber thickness, tread profile and carcass profile in the shoulder portion, and then the present invention was made.

SUMMARY OF THE INVENTION

It is therefore, an object of the present invention to provide a radial tire, in which, by specifically defining the tread rubber thickness and the cambers of the belt, carcass and tread face in the tire shoulder portion, the ground pressure distribution is evened to effectively reduce the uneven wear of the shoulder portion.

According to the present invention, a radial tire comprises a carcass extending between bead portions and turned up around bead cores, a belt disposed radially outside the carcass and including a breaker belt composed of a widest ply and a second widest ply of cords crossing each other and defining a belt thickness center line as of the two plies, the second widest ply defining the effective belt width BE, and a tread rubber disposed on the radially outside of the belt and having a tread face, wherein the thickness (B) at an effective belt edge point P being smaller than the thickness (A) of the tread rubber at the tire equator, and a belt edge camber height CH being in the range of from 0.5 to 0.75 times a shoulder camber height SH, and further the belt edge camber height CH being in the range of from 0.5 to 0.75 times a carcass camber height KH, wherein the thickness of the tread rubber is the radial distance between the radially outermost surface of the belt and the tread face, the effective belt edge point P corresponds to the axially outermost edge of the effective belt width BE, the belt edge camber height CH is the radial distance between the effective belt edge point P and an axially inner point Q, both on the belt thickness center line, the point Q located axially inward of the point P by an axial distance of 0.2 times the effective belt width BE, the tread shoulder camber height SH is the radial distance between an axially outer point R and an axially inner point S, both on the tread face, the point R located at the same axial position as the point P, the point S located at the same axial position as the point Q, the carcass camber height KH is the radial distance between an axially outer point T and an axially inner point U, both on the carcass thickness center line, the point T located at the same axial position as the point P, the point U is located at the same axial position as the point Q and the carcass thickness center line is defined as formed by all carcass plies in the carcass.

During running of a tire, a tread rubber is repeatedly compressed in the shoulder portion, and the thickness thereof is repeatedly changed. As shown in FIG. 4, in the ground contacting patch of a tire the tread rubber is compressed in the shoulder portion, and the thickness thereof is increased to increase the ground pressure in this portion.

In the present invention, the tread rubber thickness (B) in the tread shoulder portion is set to be smaller than the tread rubber thickness (A) at the tire equator in advance. Therefore, the increase in the ground pressure in the shoulder portion due to the increased rubber thickness can be prevented.

Further, as shown in FIG. 5, the edge of a belt 7 is repeatedly deformed during running.

If the CH/SH camber ratio is more than 0.75, the belt edge becomes excessively rounded, and a severe stress is liable to occur in the belt edge, and as a result the uneven wear is promoted due to the resultant heat generation.

In order to minimize the stress in the belt edge, ideally, the deformed state in the ground contacting patch and the undeformed normal state are designed to be substantially symmetrical about an axial straight line (n) as shown in FIG. 5, which is accomplished by setting the CH/SH camber ratio at about 0.5. However, if the CH/SH camber ratio is less than 0.5, the belt edge becomes excessively flat, and the belt edge is liable to be exposed in the bottom of tread shoulder grooves.

Furthermore, as the CH/SH camber ratio is from 0.5 to 0.75 and also the CH/KH camber ratio is from 0.5 to 0.75, the shoulder camber height SH is not very much differed from the carcass camber height KH. As a result, in the ground contacting patch in which the carcass is deformed into a flat form, the carcass becomes almost parallel with the road surface, which can improve the ground pressure distribution.

BRIEF DESCRIPTION OF THE DRAWINGS

An embodiment of the present invention will now be described in detail in conjunction with the accompanying drawings, in which.

DETAILED DESCRIPTION OF THE INVENTION

Figure 1:
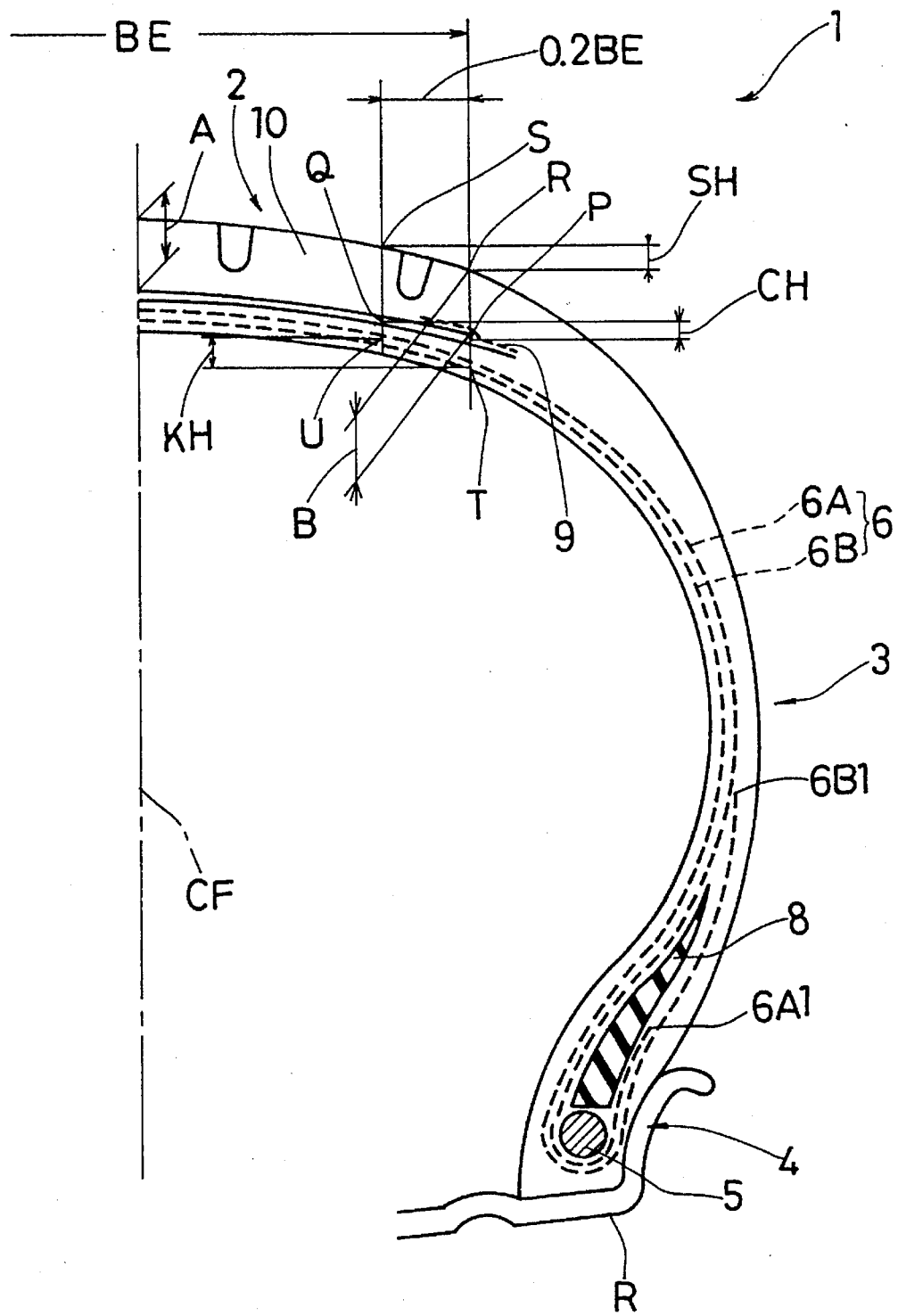
FIG. 1 is a cross sectional view of an embodiment of the present invention.
Figure 2:
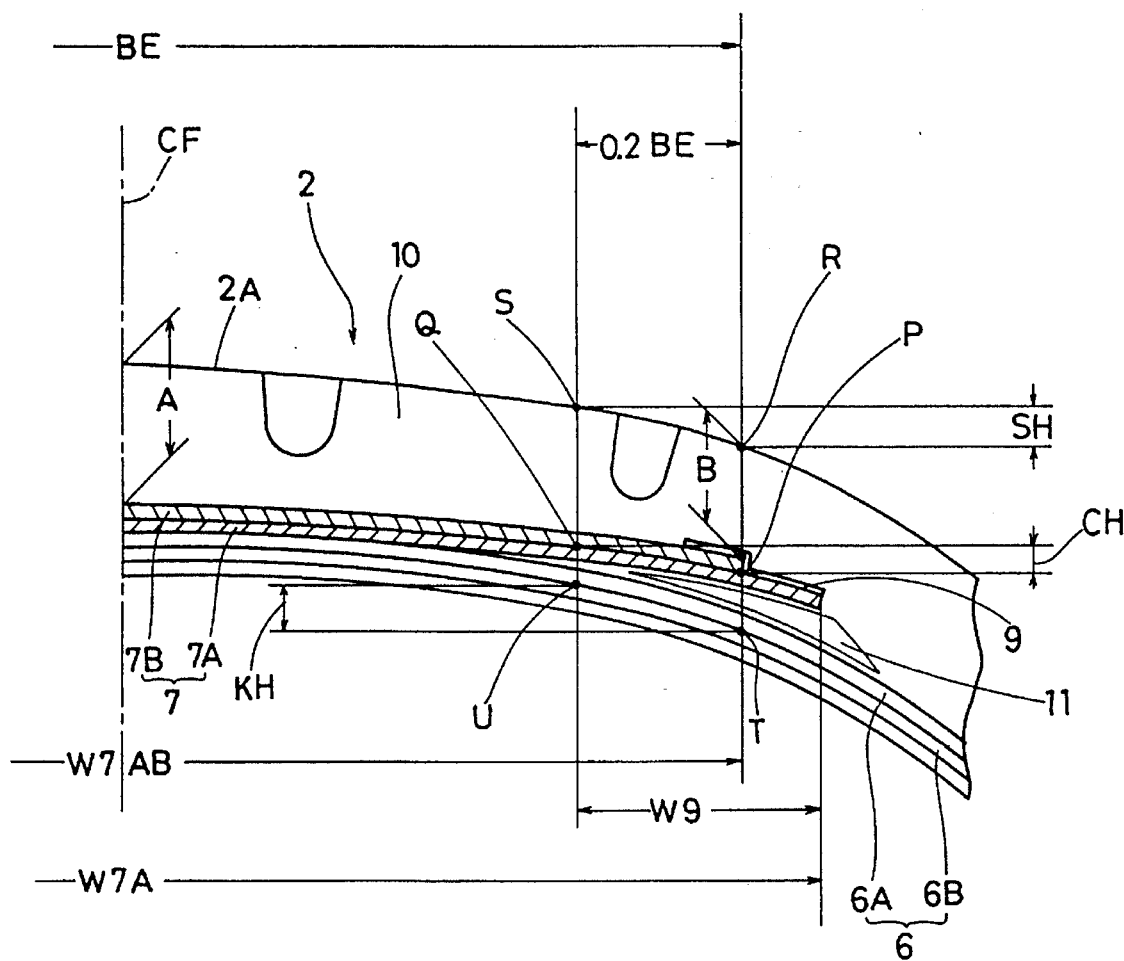
FIG. 2 is an enlarged cross sectional view of the tread portion thereof.

In FIGS. 1 and 2, the radial tire 1 according to the present invention comprises a tread portion 2, a pair of axially spaced bead portions 4, a pair of sidewall portions 3 extending between the tread edges and the bead portions 4, a pair of bead cores 5 each disposed in each bead portions 4, a carcass 6 extending between the bead portions 4, a belt disposed radially outside the carcass 6, and a tread rubber 10 disposed on the radially outside of the carcass 6.

The carcass 6 consists of an inner ply 6A and an outer ply 6B, each turned up around the bead cores 5 from the axially inside to the outside of the tire to be secured thereto. The turnup end 6A1 of the inner ply 6A is terminated radially outward of the bead core 5, and the turnup end 6B1 of the outer ply 6B is terminated radially outward of the turnup end 6A1 near the maximum width point of the tire. Each carcass ply is composed of cords arranged radially at 60 to 90 degrees with respect to the tire equatorial plane CF to have a radial or semiradial structure. For the carcass cords, organic fiber cords, e.g. nylon, rayon, polyester and the like and steel cords can be used.

Between the carcass main portion and each turned up portion in each bead portion 4, a bead apex 8 made of a rubber composition tapered radially outwardly from the bead core 5 is disposed.

The belt in this embodiment comprises a breaker belt 7 disposed on the radially outside of the carcass 6, and a band belt 9 disposed on the radially outside of the breaker belt 7.

The breaker belt 7 comprises a radially inner ply 7A and an radially outer ply 7B. Each belt ply 7A, 7B is composed of parallel steel cords laid at angle of about 10 to 30 degrees with respect to the tire equator so as to cross the next ply. The outer belt ply 7B or second widest ply is set at the substantially same width of the ground contacting width of the tread. The width W7A of the inner belt ply 7A is about 1.01 to 1.20 times the width W7B of the outer belt ply 7B.

The band belt 9 in this example is a so called edge band consisting of a pair of axially spaced narrow plies of cords. The cords are laid substantially parallel to the tire equatorial plane CF at an angle of 0 to 10 degrees, preferably 0 to 5 degrees with respect to the tire equatorial plane CF. Each narrow ply has a width W9 of 15 to 40% of the width W7A of the widest belt ply 7A, and is disposed so as to cover all the edges of the inner and outer belt plies 7A and 7B. For the band cords, extensible organic fiber cords, e.g. nylon, polyester, rayon and the like are used.

Further, a wedge-shaped breaker cushion rubber 11 is disposed between each belt edge and the carcass 6 so that the distance between the belt and the carcass increases towards the belt edge.

Figure 3:
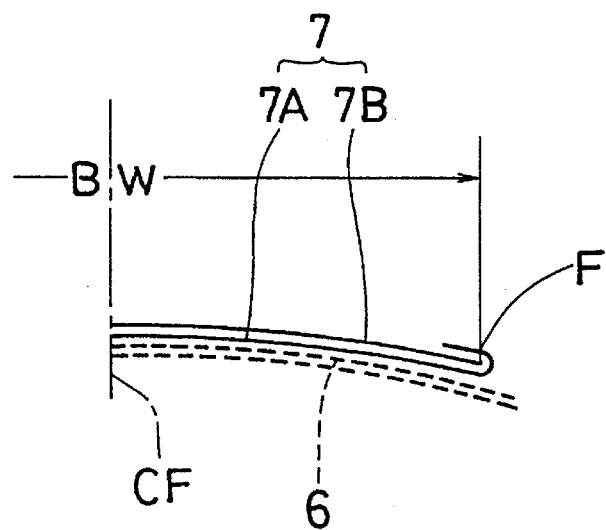
FIG. 3 is a cross sectional view schematically showing another example of the breaker belt.
Figure 4:
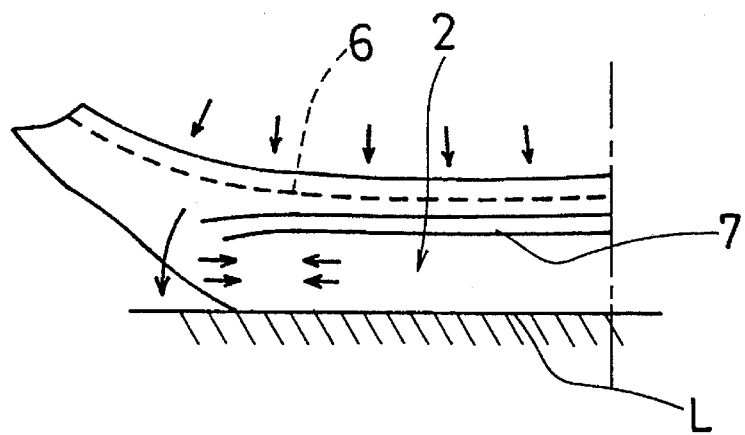
FIG. 4 is a cross sectional view explaining a ground contacting state of a tire.
Figure 5:
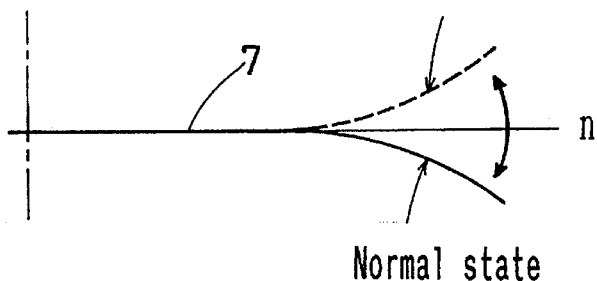
FIG. 5 is a cross sectional view explaining the movement of a breaker belt edge.

In the example in FIGS. 1 and 2, each of the inner and outer breaker plies 7A and 7B is a so called full-width cut-end ply. However, it is possible to use another belt structure, for example, a combination of a radially outer cut-end ply 7B and a radially inner fold-end ply 7A the edges of which are folded back upon the outer ply 7B as shown in FIG. 3.

The radial tire 1 is mounted on its regular rim R and inflated to a standard inner pressure, wherein the regular rim R is a rim officially approved for the tire by TRA (USA), ETRTO (Europe), JATMA (Japan) and the like, and the standard inner pressure is 75% of the maximum air pressure for the tire officially specified by the same associations. Under such standard condition, the followings are specifically defined.

Here, the effective width BE of the breaker belt 7 is defined as the maximum width of a portion in which at least two plies are overlapped each other, that is, the second widest width. Therefore, in FIGS. 1 and 2 example, the effective belt width BE is that of the radially outer ply 7B. In FIG. 3, the effective belt width BE is that of the radially outer ply 7B. Further, the belt edge camber height CH is defined as the radial distance between the effective belt edge point P and an axially inner point Q, both on the belt thickness center line, wherein. the effective belt edge point P is the axially outermost edge of the effective belt width BE, the point Q is located axially inward of the point P by an axial distance of 0.2 times the effective belt width BE, and the belt thickness center line is defined as formed by the two breaker plies which are the widest ply 7A and the second widest ply 7B defining the above-mentioned overlapped portion.

The belt profile which is the belt thickness center line is curved so that a central portion thereof has a larger radius of curvature than the edge portions thereof, and the belt edge camber height CH is in the range of from 0.05 to 0.4 times the effective belt width BE. If the belt edge camber height CH is less than 0.05 times the effective belt width BE, the belt edge becomes excessively flat, and the tread rubber thickness around the belt edge becomes very small. As a result, in the end of tire wear life, the belt edge comes out to the tread surface, although tread grooves remain in the tread crown portion. If the belt edge camber height CH is more than 0.4 times the effective belt width BE, the belt edge becomes excessively rounded. As a result, the movement of the belt edge increases and the uneven wear in the tread shoulder portion is promoted.

Further, the carcass 6, and the tread face 2A are provided with curved profiles satisfying the following conditions.

The belt edge camber height CH is more than 0.5 times but less than 0.75 times the shoulder camber height SH, and further the belt edge camber height CH is more than 0.5 times but less than 0.75 times the carcass camber height KH. The tread shoulder camber height SH is defined as the radial distance between an axially outer point R and an axially inner point S, both on the tread face 2A, wherein the point R is located at the same axial position as the point P, and the point S is located at the same axial position as the point Q. The carcass camber height KH is defined as the radial distance between an axially outer point T and an axially inner point U, both on the carcass thickness center line, wherein the point T is located at the same axial position as the point P, the point U is located at the same axial position as the point Q, and the carcass thickness center line is defined as formed by all the carcass plies.

Furthermore, the tread shoulder camber height SH is preferably set at the substantially same value as the carcass camber height KH. That is, the CH/SH ratio and the CH/KH ratio are preferably set at a substantially same value.

Still furthermore, the thickness (B) of the tread rubber 10 at the effective belt edge point P is set at a smaller value than the thickness (A) at the tire equator CF, wherein the tread rubber thickness is defined as measured from the radially outer surface of the belt to the tread face 2A in the radial direction of the tire.

Test tires of size 225/50R16 having the construction shown in FIG. 1 were made and tested for shoulder wear resistance and uneven wear resistance.

In the test, the test tire was mounted on a front wheel of a FR type passenger car and run for 20,000 kilometers under the maximum tire load and the regular pressure therefor. Then, the difference between the tire diameters measured before and after the running were obtained to evaluate the shoulder wear and uneven wear into four ranks. The test results are shown in Table 1.

TABLE 1

|  | Ex.1 | Ex.2 | Ex.3 | Ex.4 | Ref.1 | Ref.2 | Ref.3 | Ref.4 | Ref.5 |
| --- | --- | --- | --- | --- | --- | --- | --- | --- | --- |
| CH/BE | 0.05 | 0.2 | 0.2 | 0.4 | 0.2 | 0.2 | 0.2 | 0.02 | 0.5 |
| CH/SH | 0.56 | 0.56 | 0.75 | 0.56 | 0.86 | 0.76 | 0.59 | 0.56 | 0.56 |
| CH/KH | 0.56 | 0.56 | 0.72 | 0.56 | 0.81 | 0.57 | 0.77 | 0.56 | 0.56 |
| A-B (mm) | 2.5 | 12.5 | 2.5 | 2.5 | 1.2 | 2.5 | 2.5 | 2.5 | 2.5 |
| Test Result*1 |  |  |  |  |  |  |  |  |  |
| Shoulder wear | B | A | B | B | C | D | C | D*5 | D |
| Uneven wear | A | A | B | B | D*2 | C*3 | D*4 | A | D*4 |

*1 A: excellent, B: good, C: large wear was caused, D: severe wear was caused
*2 A severe heel and toe wear was caused in the shoulder portion.
*3 A large heel and toe wear was caused in the crown portion.
*4 A large heel and toe wear was caused in the shoulder portion.
*5 The breaker edge was came out to the tread shoulder surface in the end of wear life.

Figure 6:
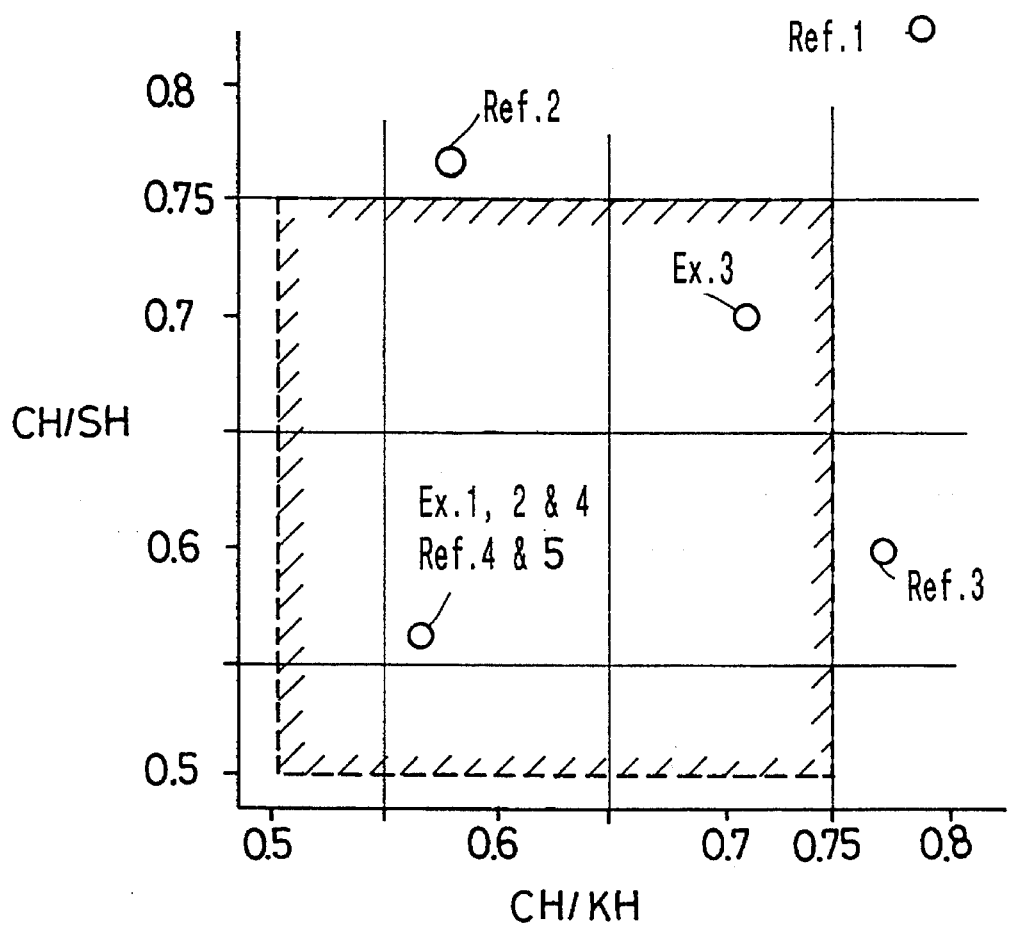
FIG. 6 is a graph showing the belt edge camber height CH/shoulder camber height SH ratio, and the belt edge camber height CH/carcass camber height KH ratio of each test tire.

FIG. 6 shows the CH/SH camber ratio and CH/KH camber ratio of the test tires.

As described above, in the radial tire of the present invention, the tread rubber thickness, belt edge camber height, tread shoulder camber height, and carcass camber height are specifically defined. Therefore, the shoulder wear resistance and uneven wear resistance can be effectively improved.

In addition to passenger tires, the present invention can be applied to truck/bus tires, light truck tires and the like. In the present invention, the band belt 9 can be eliminated. Further, it is possible to employ another carcass structure. It is also possible to dispose in each bead portion with a reinforcing cord layer for increasing the rigidity of the bead portion, and/or an organic cord layer called chafer for preventing the inner ply 6A from being chafed by the bead core 5.

We claim:

1. A radial tire comprising a carcass extending between bead portions and turned up around bead cores, a belt disposed radially outside the carcass, said belt consisting of a breaker belt disposed on the radially outside of the carcass and a band belt disposed on the radially outside of the breaker belt, said breaker belt consisting of a radially inner wide ply of cords and a radially outer narrow ply of cords crossing each other and defining a belt thickness center line of the two plies, said narrow ply defining the effective belt width BE, and said band belt consisting of a pair of axially spaced narrow plies of cords laid at an angle of 0 to 10 degrees with respect to the tire equatorial plane, a tread rubber disposed on the radially outside of the belt and having a tread face, the thickness (A) of the tread rubber at the tire equator being larger than the thickness (B) from an effective belt edge point P radially to the tread face, and a belt edge camber height CH being in the range of from 0.5 to 0.75 times a shoulder camber height SH, and further the belt edge camber height CH being in the range of from 0.5 to 0.75 times a carcass camber height KH, wherein the shoulder camber height is substantially the same value as the carcass camber height KH, the belt edge camber height CH is in the range of from 0.05 to 0.4 times the effective belt width BE, the thickness (A) at the tire equator is the radial distance between the radially outermost surface of said belt and the tread face, said effective belt edge point P corresponds to the axially outermost edge of the effective belt width BE, said belt edge camber height CH is the radial distance between said effective belt edge point P and an axially inner point Q, both on the belt thickness center line, said point Q located axially inward of the point P by an axial distance of 0.2 times the effective belt width BE, said tread shoulder camber height SH is the radial distance between an axially outer point R and an axially inner point S, both on the tread face, said point R located at the same axial position as the point P, said point S located at the same axial position as the point Q, said carcass camber height KH is the radial distance between an axially outer point T and an axially inner point U, both on the carcass thickness center line, said point T located at the same axial position as the point P, said point U is located at the same axial position as the point Q, and the carcass thickness center line is defined as formed by all carcass plies in the carcass.

* * * * *